United States Patent
Thompson

(10) Patent No.: US 9,058,295 B2
(45) Date of Patent: Jun. 16, 2015

(54) ENCRYPT DATA OF STORAGE DEVICE

(71) Applicant: Hewlett-Packard Development Company, L.P., Fort Collins, TX (US)

(72) Inventor: Mark J. Thompson, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 120 days.

(21) Appl. No.: 13/870,820

(22) Filed: Apr. 25, 2013

(65) Prior Publication Data

US 2014/0325242 A1  Oct. 30, 2014

(51) Int. Cl.
G06F 12/14 (2006.01)
(52) U.S. Cl.
CPC .................. G06F 12/1408 (2013.01)
(58) Field of Classification Search
CPC .................................................. G06F 12/1408
USPC ......................................................... 713/193
See application file for complete search history.

(56) References Cited

U.S. PATENT DOCUMENTS

| | | | |
|---|---|---|---|
| 5,412,780 A | 5/1995 | Rushton | |
| 5,638,299 A * | 6/1997 | Miller | 702/127 |
| 5,790,828 A | 8/1998 | Jost | |
| 6,405,256 B1 | 6/2002 | Lin et al. | |
| 7,434,069 B2 | 10/2008 | Nessler et al. | |
| 8,484,720 B2 * | 7/2013 | Mardiks | 726/17 |
| 8,798,312 B2 * | 8/2014 | Kiyoshige | 382/100 |
| 2008/0040536 A1 | 2/2008 | Juang et al. | |
| 2014/0040639 A1 * | 2/2014 | Raam | 713/193 |

OTHER PUBLICATIONS

Dyer, K.P. et al., Format-transforming Encryption: More Than Meets the DPI, (Research Paper), Aug. 28, 2012.

\* cited by examiner

*Primary Examiner* — Dant Shaifer Harriman
(74) *Attorney, Agent, or Firm* — Hewlett-Packard Patent Department

(57) ABSTRACT

A request from a host is received requesting data from a storage device. Data of the storage device is written into a buffer of the host. The data at the buffer is to be encrypted and written back to the storage device. The requested data of the request is written to the buffer after the encrypted data is written back to the storage device.

14 Claims, 4 Drawing Sheets

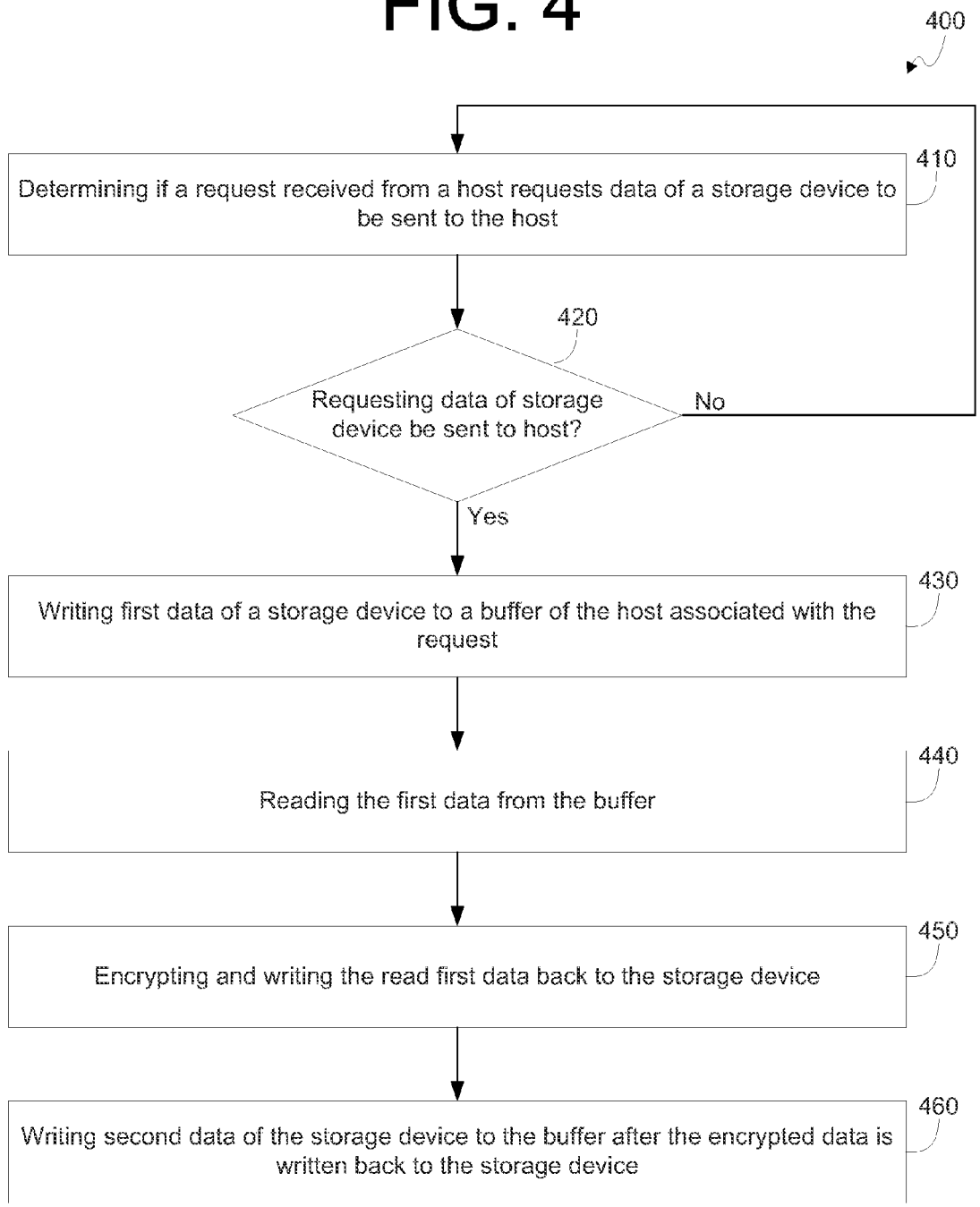

ENCRYPT DATA OF STORAGE DEVICE

BACKGROUND

Storage device controllers may receive data and encrypt the received data before writing the encrypted data to a storage device. A host seeking to write data to or read data from the storage device may send a request to the storage device controller in order to access the storage device.

BRIEF DESCRIPTION OF THE DRAWINGS

The following detailed description references the drawings, wherein:

FIG. 4 is an example flowchart of a method for encrypting data of a storage device.

DETAILED DESCRIPTION

Specific details are given in the following description to provide an understanding of examples of the present techniques. However, it will be understood that examples of the present techniques may be practiced without these specific details. For example, systems may be shown in block diagrams in order not to obscure examples of the present techniques in unnecessary detail. In other instances, well-known processes, structures and techniques may be shown without unnecessary detail in order to avoid obscuring the examples of the present techniques.

Some types of storage device controllers may only encrypt data being received, such as data crossing a Peripheral Component Interconnect Express (PCIE) boundary as it is transferred from a host's memory to the storage device controller. Upon encrypting the received data, the storage device controller may then write the encrypted data to a storage device. Thus, while any new data to be written to the storage device may be encrypted by the storage device controller, old or existing data on the storage device may not be encrypted by the storage device controller. Moreover, modifying or adding hardware of the storage device controller so that the storage device controller can directly encrypt data of the storage device may prove difficult and/or cost prohibitive.

Examples of the present techniques may dynamically borrow the host's buffer to store plaintext data of the storage device and then write back the plaintext data from the buffer to the storage device in encrypted form. For example, in an example, a device may include an interface unit, a transfer unit and an encryption unit. The interface unit may receive a request from a host requesting data from a storage device. The transfer unit may write plaintext data of the storage device into a buffer of the host, in response to the request. The encryption unit may encrypt the plaintext data and write the encrypted data back to the storage device. Then, the interface unit may write the requested data of the request to the buffer after the encrypted data is written back to the storage device. Thus, examples may allow for existing data of the storage device to be encrypted by a storage device controller that is limited to encrypting only data to be written to the storage device, at a low cost and/or latency.

Figure 1:
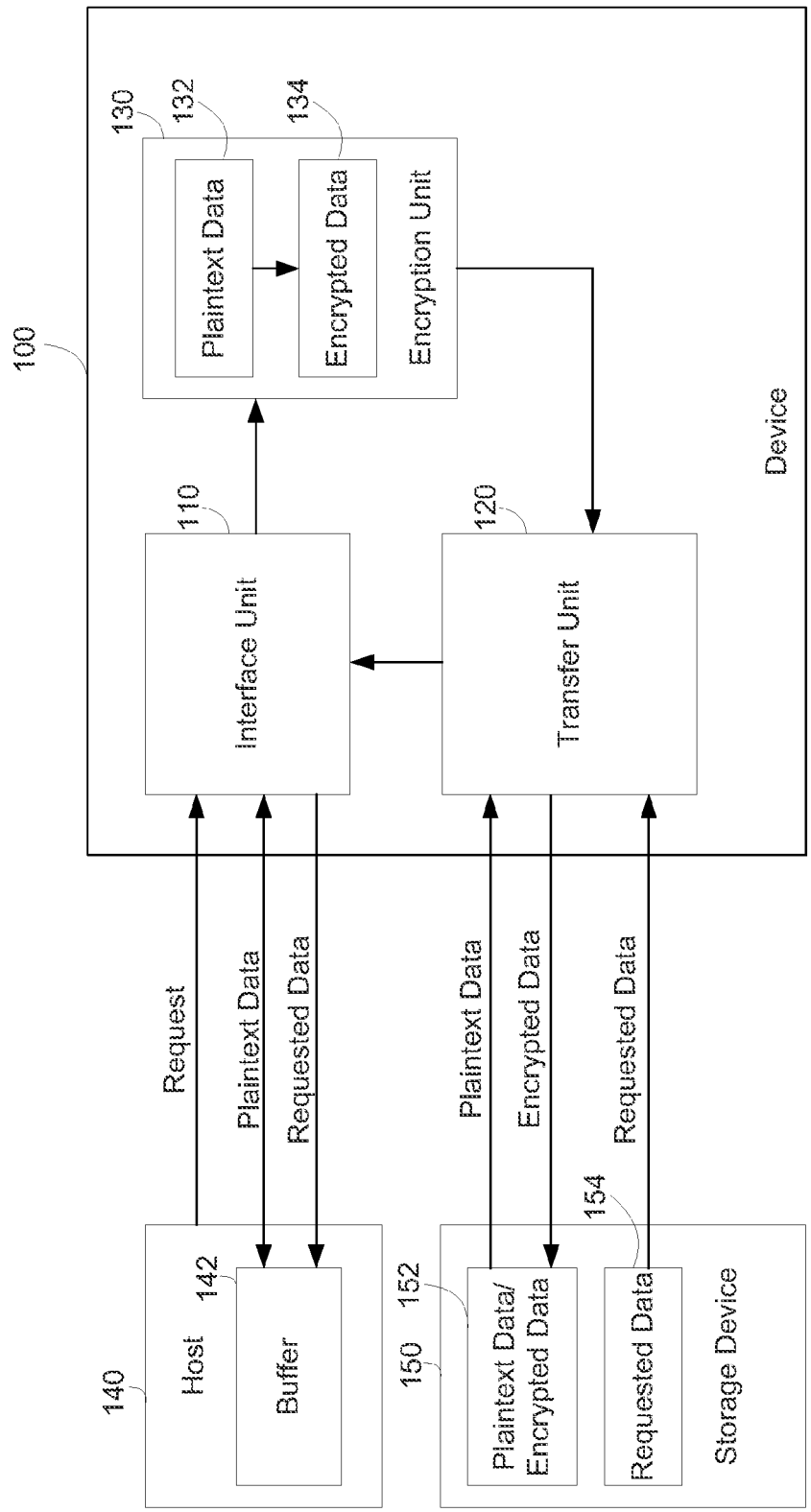
FIG. 1 is an example block diagram of a device to encrypt data of a storage device.

Referring now to the drawings, FIG. 1 is an example block diagram of a device 100 to encrypt data of a storage device 150. The device 100 may couple to or be included in any type of computing device or controller that interfaces with a memory, such as a secure microprocessor, a storage device controller, a notebook computer, a desktop computer, an all-in-one system, a server, a network device, a wireless device and the like. In the example of FIG. 1, device 100 interfaces with a host 140 and the storage device 150. For example, the device 100 may communicate with the storage device 150 via a Serial Attached SCSI (SAS) connection and may communicate with the host 140 via a Peripheral Component Interconnect (PCI) connection, Ethernet or IP protocol connection.

The host 140 may refer to any type of device that seeks to access the storage device 150, such as a main processor of a computer or a computer connected to a computer network. The storage device 150 may be any electronic, magnetic, optical, or other physical storage device that stores data, such as a hard disk drive (HDD), solid-state drive (SSD) and the like. For example the storage device 150 may include one or more physical drives (not shown) and one or more logical data volumes spanning one or more of the drives.

In FIG. 1, the device 100 is shown to include an interface unit 110, a transfer unit 120 and an encryption unit 130. The interface, transfer and encryption units 110, 120 and 130 may include, for example, a hardware device including electronic circuitry for implementing the functionality described below, such as control logic and/or memory. In addition or as an alternative, the interface, transfer and encryption units 110, 120 and 130 may be implemented as a series of instructions encoded on a machine-readable storage medium and executable by a processor.

The interface unit 110 may receive a request from the host 140 requesting data from a storage device 150. The request may be a read type request, a sense type request or any other type of request related to a transfer of data from the storage device 150 to the host 140. The read request may relate to accessing data at a location of the storage device 150 indicated by the read request. The location may include one or more addresses of the storage device 150. The sense request may relate to accessing sense data at a location of the storage device 150 indicated by the sense request. The sense data may include status/error information related to the data and indicate a success/normal condition, simple problems such as no disk being loaded, serious hardware failures, and the like. For example, the device 100 may transfer the data and/or sense data thereof from the storage device 150 to the buffer 142 in response to the read or sense type request of the host 140.

The transfer unit 120 may write plaintext data of the storage device 150 into a buffer 142 of the host 140, in response to the request. The term plaintext may refer to an unaltered representation of data before any action has been taken to conceal, compress, or modify it in another manner. The term plaintext does not necessarily refer to text nor data that is plain.

An amount of the plaintext data written to the buffer 142 may be based on a size allocated for the buffer 142 by the host 140 for the requested data. For example, if the host 140 requested to read 512 bytes or a block of data of the storage device 150 via the read request, then the host 140 may have allocated the buffer 142 to be 512 bytes or a block long. Further, the host 140 may have a plurality of buffers allocated based on a plurality of outstanding requests to the storage device 150.

However, the plaintext data written to the buffer 142 by the transfer unit 120 may not be the data requested by the host 140 via the request. Instead, the plaintext data may simply be data which the device 200 seeks to write back to the storage device 150 in encrypted form. Thus, the transfer unit 120 may, for example, read plaintext from the storage device 150 that the device 100 seeks to encrypt, in response to the request, such as the read or sense type request. For example, in FIG. 1 the plaintext data is shown to be read from a first location 152 that is different from a second location 154 where the actual requested data is stored in the storage device 150.

In one embodiment, the plaintext data may be read sequentially or iteratively from a disc of a storage volume (not shown) of the storage device 150. As the host 140 may only allocate the buffer 142 when the host 140 expects to receive data in response to the request, the host 140 may not allocate the buffer 142 when sending a write request. Thus, the device 100 may not send the plaintext data to the host 140 for the write request. Nonetheless, the device 100 may still process the write request by writing data from the host 140 to the storage device 150.

The encryption unit 130 may encrypt the plaintext data and may write the encrypted data back to the storage device 150. As shown in FIG. 1, for example, the encryption unit 130 may receive the plaintext data from the buffer 142 via the interface unit 110, encrypt the plaintext data, and then output the encrypted data to the storage device 150

Encryption may refer to a process of encoding data in such a way that unauthorized parties may not decipher the data while authorized parties may decipher the data. In an encryption scheme, the plaintext may be encrypted using a cryptographic algorithm, turning it into an unreadable ciphertext. This is usually done with the use of an encryption key, which specifies how the message is to be encoded. For instance, the key may be a piece of information or parameter that determines a functional output of a cryptographic algorithm. The cryptographic algorithm may be a symmetric or asymmetric key algorithm. Examples of symmetric algorithms include Twofish, Serpent, AES (Rijndael), Blowfish, CAST5, Rivest Cipher 4 (RC4), Triple Data Encryption Algorithm (3DES), International Data Encryption Algorithm (IDEA) and the like. Examples of asymmetric algorithms include Diffie-Hellman key exchange protocol, Digital Signature Standard (DSS), ElGamal, Paillier cryptosystem, RSA encryption algorithm and Cramer-Shoup cryptosystem, and the like. These algorithms may include a procedure for performing encryption or decryption.

As shown in FIG. 1, the encrypted data may be written to the same first location 152 as the plaintext data from which the encrypted data was derived. Thus, by allowing the plaintext data to be overwritten with the encrypted data, the plaintext data may effectively become encrypted. The interface unit 110 may write the requested data of the request to the buffer 142 after the encrypted data is written back to the storage device 150. This way, the encrypted data may be not lost before it can be written back to the storage device 150. After the requested data is written to the buffer 142, the request may be considered completed.

The encryption unit 130 is located at the device 100, and not the host 140 or the storage device 150. Further, the encryption unit 130 may only be able to encrypt data received externally via the interface unit 110. The host 140 may only be connected to the storage device 150 via the device 100. Thus, the device 100 may encrypt the plaintext data after reading the plaintext data from the buffer 142 of the host 140 and before writing the plaintext data to the storage device 150.

Figure 2:
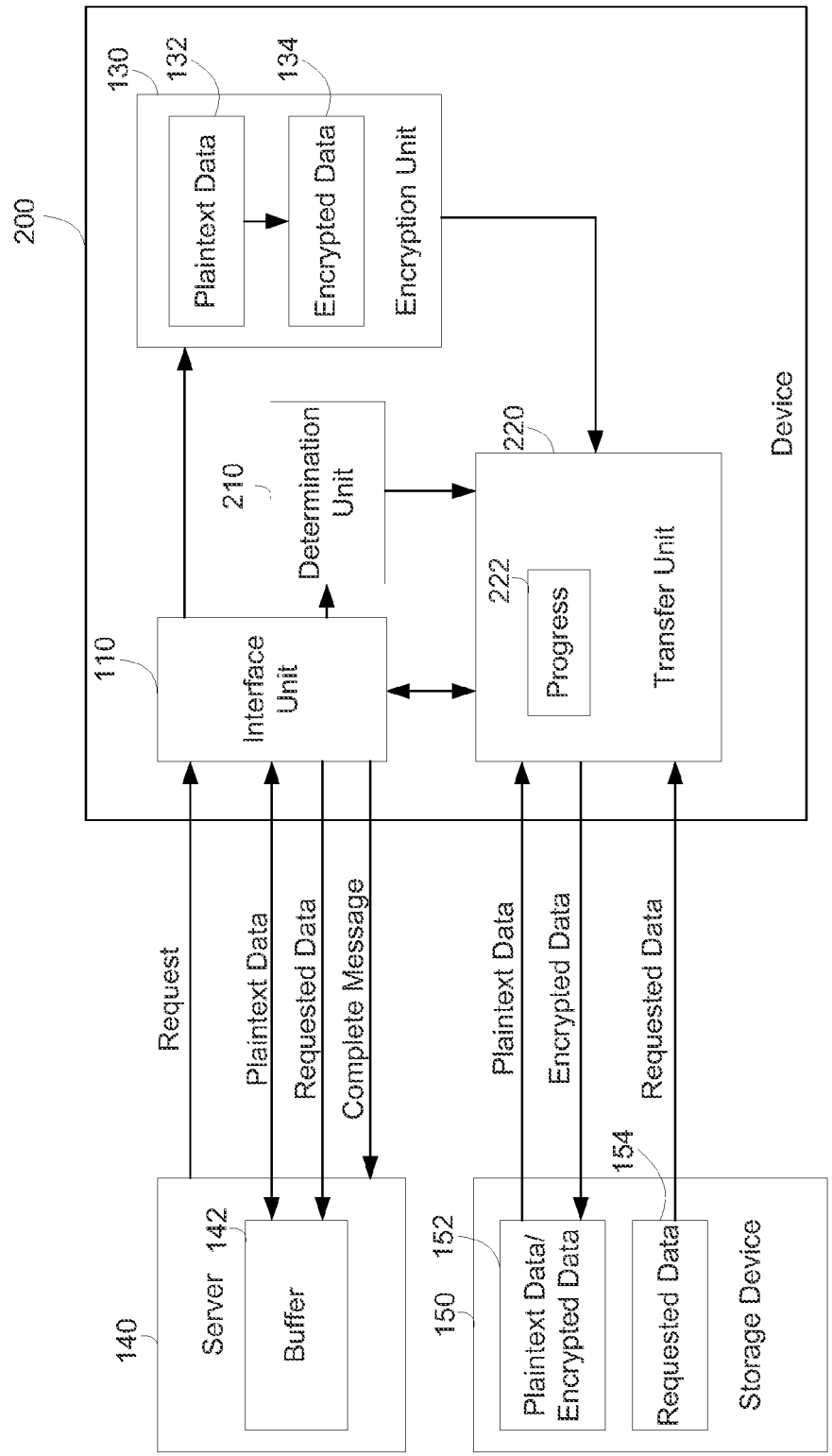
FIG. 2 is another example block diagram of a device to encrypt data of a storage device.

FIG. 2 is another example block diagram of a device 200 to encrypt data of a storage device. The device 200 may couple to or be included in any type of computing device or controller that interfaces with a memory, such as a secure microprocessor, a storage device controller, a notebook computer, a desktop computer, an all-in-one system, a server, a network device, a wireless device and the like.

The device 200 of FIG. 2 may include at least the functionality and/or hardware of the device 100 of FIG. 1. For example, the device 200 of FIG. 2 includes the interface unit 110 and the encryption unit 130 of the device 200 of FIG. 1. A transfer unit 220 included in the device 200 may have at least the functionality and/or hardware of the transfer unit 120 of FIG. 1. The device 200 further includes a determination unit 130. Similar to FIG. 1, the device 200 also interfaces with the host 140 and the storage device 150.

The determination unit 210 may include, for example, a hardware device including electronic circuitry for implementing the functionality described below, such as control logic and/or memory. In addition or as an alternative, the determination unit 210 may be implemented as a series of instructions encoded on a machine-readable storage medium and executable by a processor. The determination unit 210 may determine which of the requests received by the interface unit 110 include the at least one of read and sense type request and forward this determination to the transfer unit 220. The transfer unit 220 may carry out the above operations described in FIG. 1, if the request is the read or sense type request.

Here, the transfer unit 220 may further store a progress 222 of the encrypted data written back to the storage device 150 at a non-volatile memory (not shown). For example, the progress 222 may be a percentage number indicating what percent of the storage device 150 or a volume thereof is encrypted or remains to be encrypted. Alternatively or additionally, the progress 222 may be a log recording each logical block address (LBA) after the encrypted data has been written to that LBA.

The transfer unit 220 may reference the stored progress 222, for instance, if a power failure occurs at the device 200 before all of the encrypted data at the buffer 142 is written back to the storage device 150. In this case, the device 200 may be also to resume transferring the encrypted data from the buffer 142 to the storage device 150 from a current point at which the device 200 previously stopped. Thus, the device 200 may be able to reduce or prevent redundant encryption of plaintext data and/or redundant transfer of encrypted data.

The transfer unit 220 may send a complete message after the requested data is written to the buffer 154, to indicate to the host 140 that the request has been completed. The host 140 may then be free to reallocate the buffer 142 and/or overwrite the buffer 142 after the complete message is received. The complete message may be sent from the transfer unit 220 to the host 140 via the interface unit 110.

Figure 3:
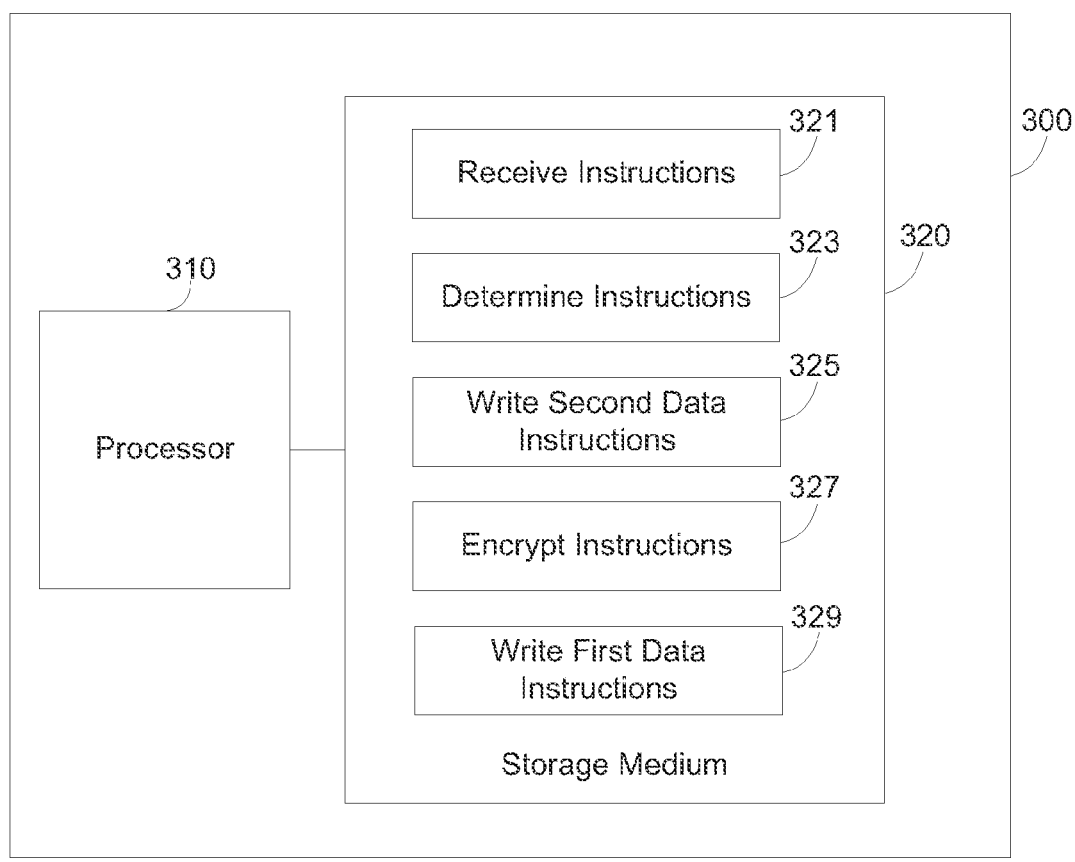
FIG. 3 is an example block diagram of a computing device including instructions for encrypting data of a storage device.

FIG. 3 is an example block diagram of a computing device 300 including instructions for encrypting data of a storage device. In the embodiment of FIG. 3, the computing device 300 includes a processor 310 and a machine-readable storage medium 320. The machine-readable storage medium 320 further includes instructions 321, 323, 325, 327 and 329 for encrypting the data of the storage device.

The computing device 300 may be, for example, a secure microprocessor, a notebook computer, a desktop computer, an all-in-one system, a server, a network device, a wireless device, or any other type of user device capable of executing the instructions 321, 323, 325, 327 and 329. In certain examples, the computing device 300 may include or be connected to additional components such as memories, sensors, displays, etc.

The processor 310 may be, at least one central processing unit (CPU), at least one semiconductor-based microprocessor, other hardware devices suitable for retrieval and execution of instructions stored in the machine-readable storage medium 320, or combinations thereof. The processor 310 may fetch, decode, and execute instructions 321, 323, 325, 327 and 329 to implement encrypting the data of the storage device. As an alternative or in addition to retrieving and executing instructions, the processor 310 may include at least one integrated circuit (IC), other control logic, other electronic circuits, or combinations thereof that include a number of electronic components for performing the functionality of instructions 321, 323, 325, 327 and 329.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for encrypting the data of the storage device.

Moreover, the instructions 321, 323, 325, 327 and 329 when executed by a processor (e.g., via one processing element or multiple processing elements of the processor) can cause the processor to perform processes, such as, the process of FIG. 4. For example, the receive instructions 321 may be executed by the processor 310 to receive a request from a host (not shown). The determine instructions 323 may be executed by the processor 310 to determine if the request is related to requesting first data from a storage device (not shown). The write second data instructions 325 may be executed by the processor 310 to write second data of the storage device to a buffer (not shown) of the host based on the determination.

The encrypt instructions 327 may be executed by the processor 310 encrypt and write the second data back from the buffer to the storage device after the second data is transmitted. The write first data instructions 329 may be executed by the processor 310 write the first data to the buffer after the encrypted data is written back to the storage device. The second data may be read from the buffer before the second data is encrypted and written to the storage device. Further, the second data may be encrypted at the device 300.

FIG. 4 is an example flowchart of a method 400 for encrypting data of a storage device. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 determines if a request received from a host 140 requests data of the storage device 150 to be sent to the host 140, such as read and sense type requests. Next at block 420, if the request does not request for data of the storage device 150 to be sent to the host 140, the method 400 flows back to block 410. However, the request, such as a write request, is still processed by the device 200 via a separate process (not shown).

Otherwise, if the request does request for data of the storage device 150 to be sent to the host 140, the method 400 proceeds to block 430. At block 430, the device 200 writes first data of the storage device 150 to a buffer 142 of the host 140 associated with the request.

For example, the buffer 142 may be memory space allocated by the host 140 for data to be returned from the storage device 150 in response to the request. The first data may include iteratively read blocks of plaintext data of a disk of a storage volume of the storage device 150. Then, at block 440, the device 200 reads the first data from the buffer after the first data has been written to the buffer 142. Next, at block 450, the device 200 encrypts and writes the read first data back to the storage device 150. For example, the device 200 may overwrite the first data at the storage device 150 with the encrypted data.

Lastly, at block 460, the device 200 may write second data of the storage device 150 to the buffer 142 after the encrypted data has been written back to the storage device 150. The second data may be associated with the requested data of the request while the first data may not be associated with requested data of the request. The request may still be active or pending at the host 140 while the device 200 is writing and reading the first data to and from the buffer 142. The request may be not active or completed at the host 140 after the second data is written to the buffer 142.

According to the foregoing, embodiments provide a method and/or device for dynamically borrowing the host's buffer to store plaintext data of the storage device and then writing back the plaintext data from the buffer to the storage device in encrypted form. Thus, embodiments may allow for existing data of the storage device to be encrypted by a storage device controller that is limited to encrypting only data to be written to the storage device, at a low cost and/or latency.

I claim:

1. A device, comprising:
   an interface to receive a request from a host requesting data from a storage device;
   a transfer unit to write plaintext data of the storage device into a buffer of the host, in response to the request; and
   an encryption unit to encrypt the plaintext data and to write the encrypted data back to the storage device, in response to the request,
   wherein the interface is to:
      write the requested data of the request to the buffer after the encrypted data is written back to the storage device, and
   wherein the transfer unit is to:
      store a progress of writing the encrypted data back to the storage device at a non-volatile memory, and
      reference the stored progress if a power failure occurs at the device before all of the encrypted data is written back to the storage device.

2. The device of claim 1, wherein an amount of the plaintext data written to the buffer is based on a size allocated for the buffer by the host for the requested data.

3. The device of claim 1, wherein the transfer unit is to send a complete message after the requested data is written to the buffer, to indicate to the host that the request is completed, and
   the host is to overwrite the buffer only after the complete message is received.

4. The device of claim 1, wherein,
the request relates to at least one of read and sense type requests, and
the request does not relate to a write type request.

5. The device of claim 4, further comprising:
a determination unit to determine which of requests includes the at least one of read and sense type requests.

6. The device of claim 1, wherein, the plaintext data stored at the buffer does not include the requested data of the request.

7. The device of claim 1, wherein the device is to encrypt the plaintext data after reading the plaintext data from the buffer and before writing the plaintext data to the storage device.

8. The device of claim 1, wherein the transfer unit is to read the plaintext data at least one of sequentially and iteratively from the storage device.

9. The device of claim 8, wherein,
the plaintext data is read from a disk of a storage volume of the storage device, and
the device is a storage device controller.

10. A method, comprising:
determining, by a device, if a request received from a host requests data of a storage device to be sent to the host; and
in response to the received request, the device:
writing first data of the storage device to a buffer of the host associated with the request, if the request requests data of the storage device to be sent to the host;
reading the first data from the buffer after the first data is written to the buffer;
encrypting the read first data and writing the encrypted first data to the storage device;
writing second data of the storage device to the buffer after the encrypted first data is written back to the storage device, wherein
the second data is associated with the requested data of the request, and
the first data is not associated with the requested data of the request; and
sending, by a transfer unit of the device, a complete message after the second data is written to the buffer, to indicate to the host that the request is completed, the host to overwrite the buffer only after the complete message is received.

11. The method of claim 10, wherein
the request is active while the first data is being written to and read from the buffer, and
the request is not active after the second data is written to the buffer.

12. The method of claim 10, wherein the first data includes iteratively read blocks of plaintext data of a disk of a storage volume of the storage device.

13. A non-transitory computer-readable storage medium storing instructions that, if executed by a device including a processor, cause the device to:
receive a request from a host;
determine if the request is related to requesting first data from a storage device; and
in response to the received request:
write second data of the storage device to a buffer of the host based on the determination;
encrypt the second data and write the encrypted second data to the storage device after writing the second data to the buffer;
store, by a transfer unit in a non-volatile memory, a progress of writing of the encrypted second data to the storage device;
reference, by the transfer unit, the stored progress if a power failure occurs at the device before all of the encrypted second data is written to the storage device; and
write the first data to the buffer after the encrypted second data is written to the storage device.

14. The non-transitory computer-readable storage medium of claim 13, wherein,
the second data is read from the buffer before the second data is encrypted and written to the storage device, and
the second data is encrypted at the device.

* * * * *